May 1, 1951  H. M. JOHNSON  2,550,818
PHOTOELECTRIC METER-SCANNING APPARATUS
Filed Oct. 25, 1949  4 Sheets-Sheet 1

INVENTOR.
HERBERT M. JOHNSON
BY
Chas. M. Hawley
ATT'Y.

May 1, 1951 H. M. JOHNSON 2,550,818
PHOTOELECTRIC METER-SCANNING APPARATUS
Filed Oct. 25, 1949 4 Sheets-Sheet 2

INVENTOR.
HERBERT M. JOHNSON
BY
Chas. T. Hawley
ATTY.

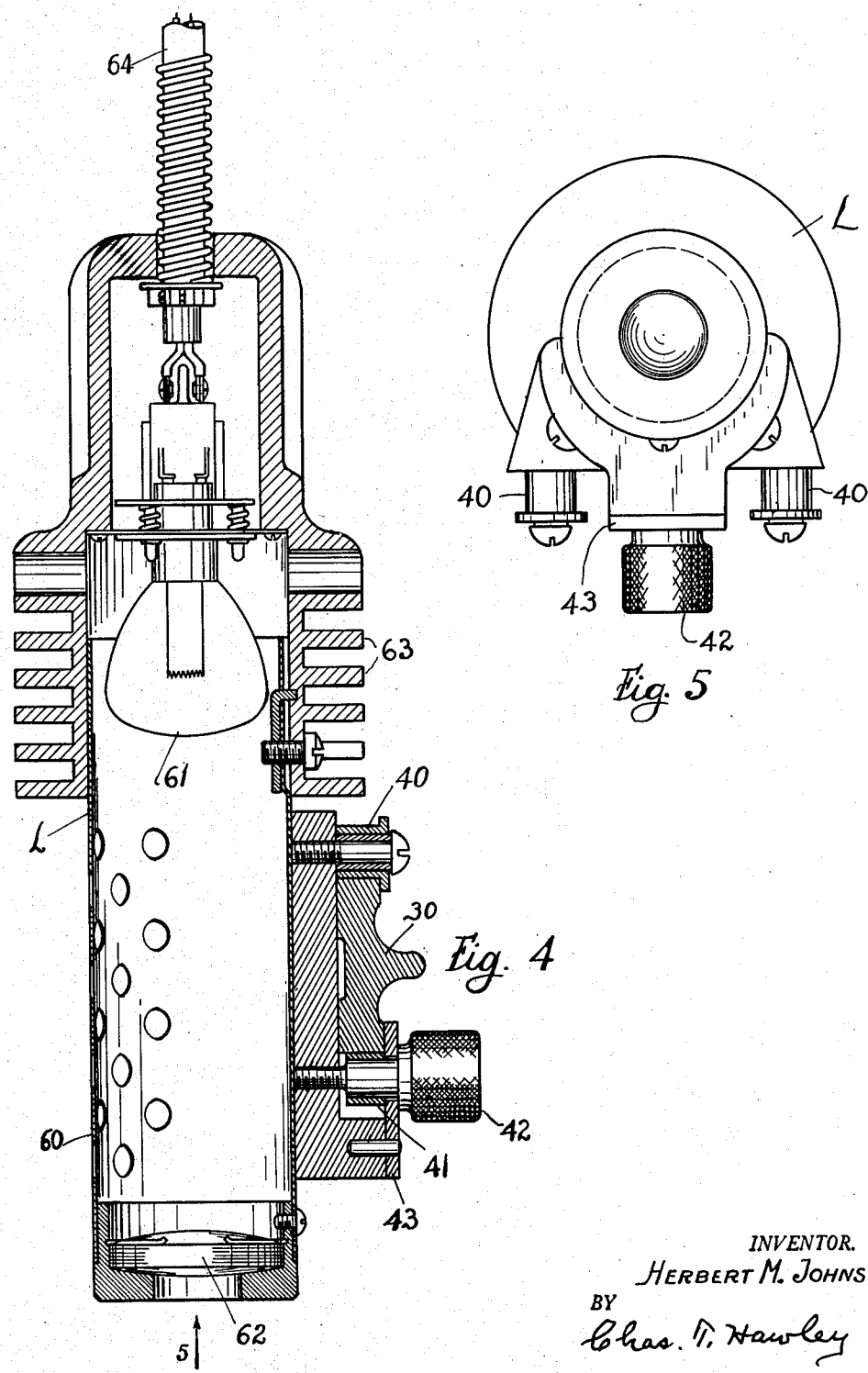

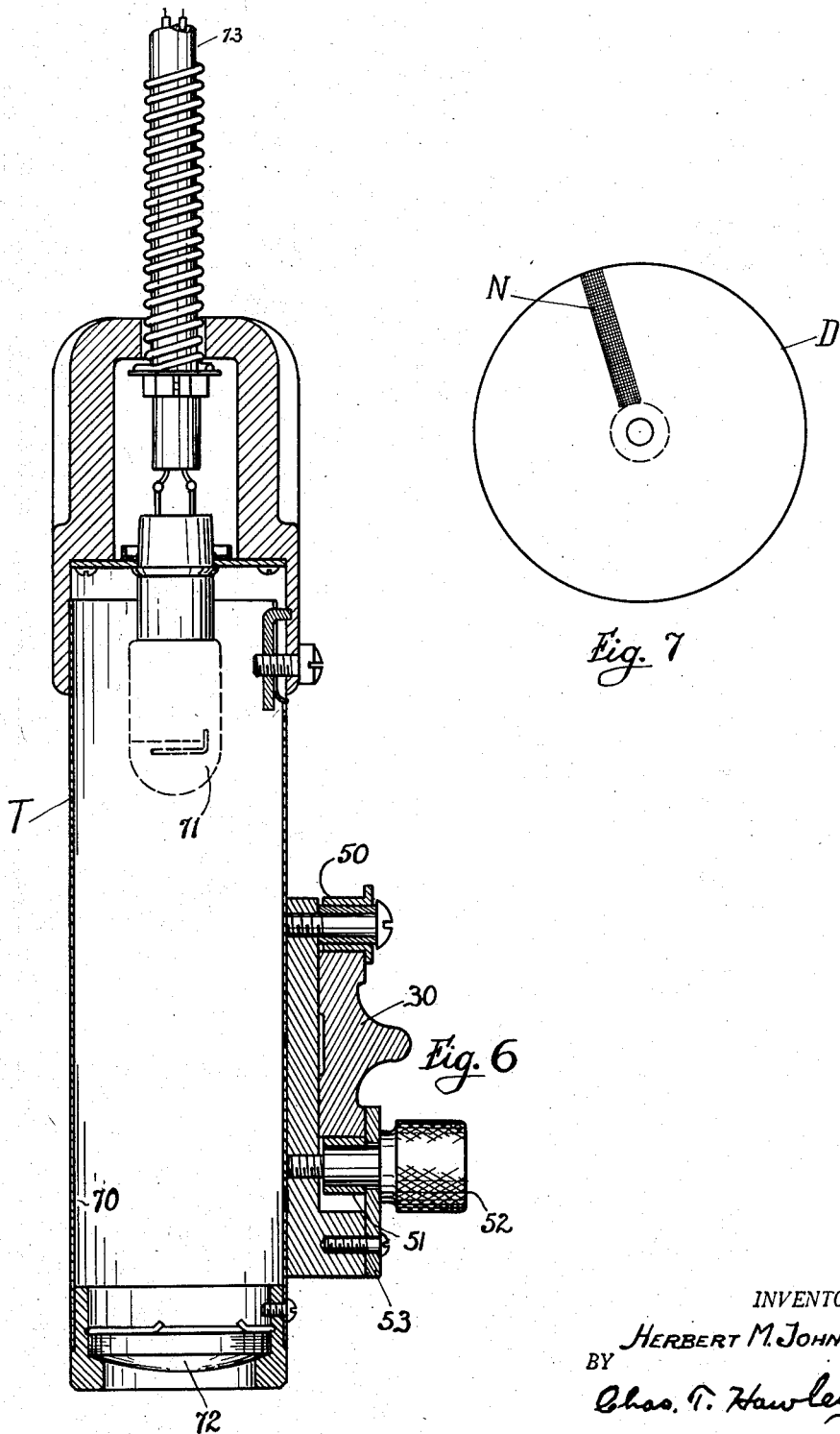

Patented May 1, 1951

2,550,818

UNITED STATES PATENT OFFICE 2,550,818

PHOTOELECTRIC METER-SCANNING APPARATUS

Herbert M. Johnson, Needham, Mass.

Application October 25, 1949, Serial No. 123,355

1 Claim. (Cl. 250—234)

This invention relates to the testing and calibrating of electric meters of the type in which a pivoted element, commonly a flat disc, is associated with counting mechanism by which the rotations of the disc are progressively totaled to indicate current consumption. The function of such scanning apparatus is to accurately record the number of revolutions of the meter disc in a given time interval, as compared to the revolutions of a standard instrument under identical conditions.

In a common type of scanning apparatus, photo-electric devices indicate the completion of each revolution of the disc by reflecting a beam of light from a polished disc surface, and by providing a black line or spot on the disc which interrupts the reflection once in each disc revolution. The counting mechanism commonly operates positively during each "dark" period. The number of interruptions in a given period is then totalled automatically.

In a somewhat different apparatus, the counting mechanism is operated positively when a light ray is transmitted to the cathode of a photoelectric cell through a perforation in a revolving opaque disc.

Electric meters are of different types and structure, and each type requires a special setting of the light source and of the photo-electric tube to secure accurate performance. It is also necessary that these two instrumentalities have a common focal point on the surface of the rotating disc.

It is the general object of my invention to improve the construction of such scanning apparatus by mounting the light source and the photo-electric tube on a common segmental support in such manner that they may each be angularly adjusted on the support but will remain directed to a common focal point in every angularly adjusted position.

Much time and labor is thus saved over previously used apparatus in which the light source and the photo-electric tube were each universally adjustable and had no necessary relation to each other nor to any common focal point except as manually directed.

My invention further relates to arrangements and combinations of parts which will be hereinafter described and more particularly pointed out in the appended claim.

A preferred form of the invention is shown in the drawings, in which

Fig. 4 is a longitudinal section of the light source assembly;

Fig. 5 is an end view thereof;

Fig. 6 is a longitudinal section of the photo-electric tube assembly; and

Fig. 7 is a plan view of a meter disc.

Figure 1:
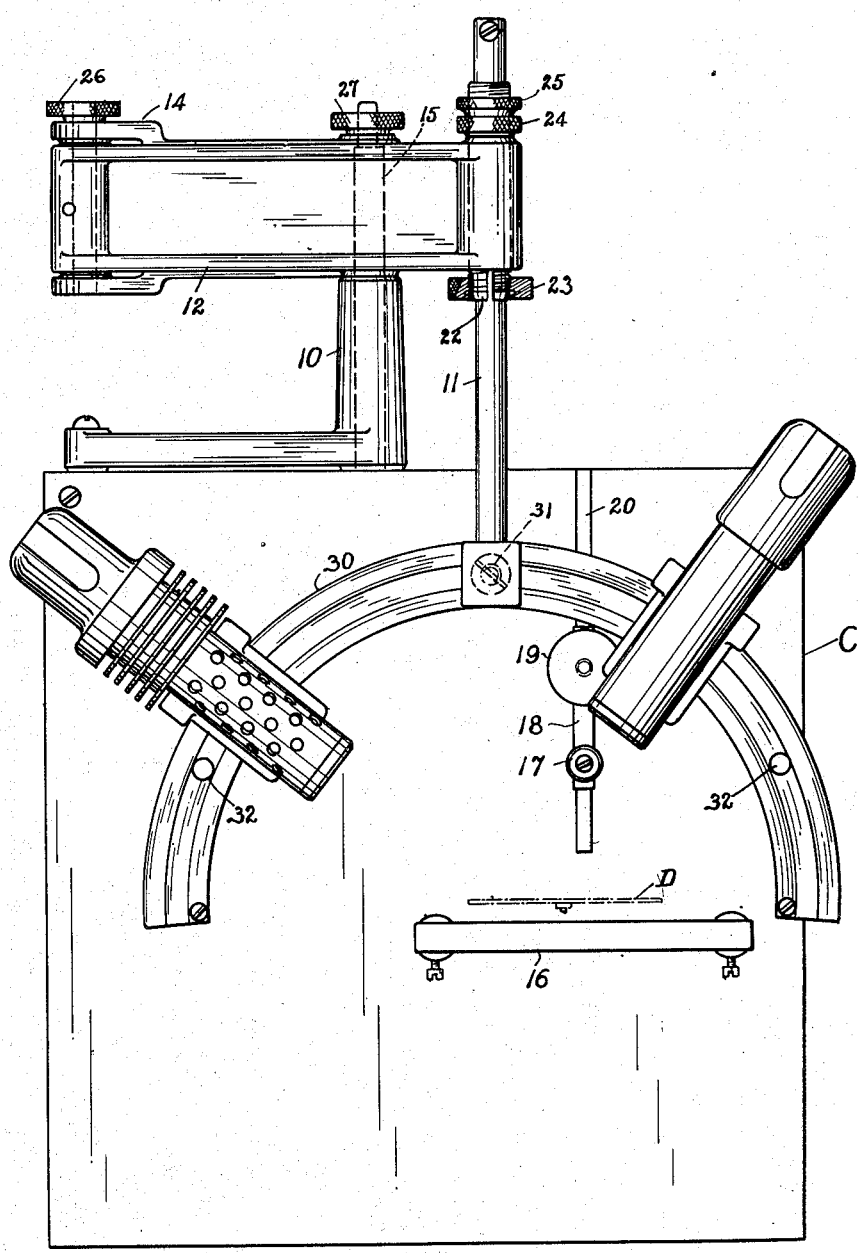
Fig. 1 is a front elevation of my improved apparatus.
Figure 2:
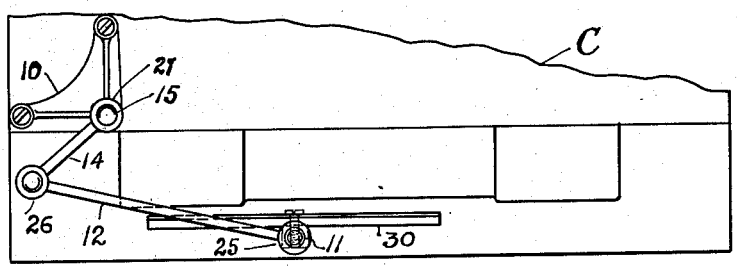
Fig. 2 is a partial plan view showing certain parts only.
Figure 3:
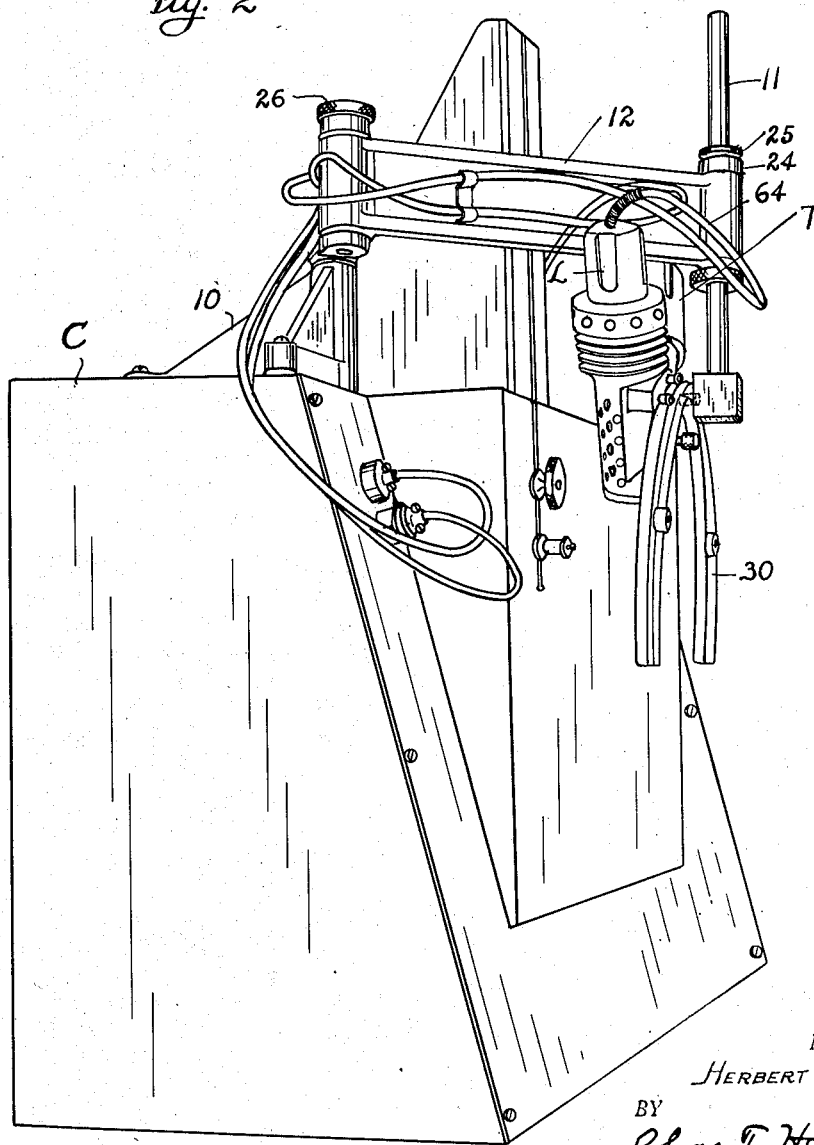
Fig. 3 is a side elevation but in partial perspective.

Referring to the drawings, I have shown my improved scanning apparatus mounted on a casing C (Fig. 1) and pivotally supported on a bearing bracket 10 which is secured to the top of the casing. An upright post 11 is clamped in the outer end of a link 12 which in turn is mounted in the outer end of an arm 14 pivoted on a stud 15 in the bearing bracket 10.

The post 11 may thus be supported in any desired vertical position relative to the meter under test, which latter is mounted on a cross-bar 16 (Fig. 1) and which is secured by a roller stud 17 on a slide 18 having a clamping knob 19. The slide 18 is mounted in a vertical slot or guideway 20 in the front of the casing C. The meter disc D is shown in broken lines in Fig. 1 and may have a radial black line N as shown in Fig. 7.

The post 11 may be vertically adjusted in the link 12 and is secured by a clutch 22 (Fig. 1) and a clutch nut 23. The post 11 and clutch 22 are also angularly adjustable in the link 12 and are secured by a clamping nut 24 and lock nut 25.

The link 12 and arm 14 may be fixed relative to each other by a clamping nut 26, and the arm 14 may be held in fixed position on the stud 15 by a clamping nut 27.

A segmental support 30 is secured to the lower end of the post 11 by a clamping stud 31 inserted in a selected one of three holes 32 in the support. The support 30 may also be swung in its own plane on the clamping stud 31.

It is thus possible to secure the segmental support in any desired relation to the disc D of the meter under test.

The specific means shown and above described for positioning the segmental support 30 may obviously be substantially varied within the scope of my invention.

A light source assembly L and a photo-electric tube assembly T are each mounted on the segmental support 30 and are separately adjustable thereon.

The light source assembly L is positioned on the segmental support 30 by spaced roller studs 40 (Fig. 5) engaging the outer edge of the support 30, and by a roller stud 41 engaging the inner edge. The stud 41 is mounted on a screw 42 which also secures a clamping plate 43 against the back face of the support 30.

The light source assembly L may thus be secured in any selected angular position on the segmental support 30, and the spaced studs 40 will direct the light beam to the center of curvature of the support 30.

The tube assembly T (Fig. 6) is similarly provided with spaced studs 50 and a coacting roller stud 51, clamping screw 52 and clamping plate 53. The spaced studs 50 center the tube assembly T on the center of curvature of the support 30, which center thus serves as a common focal point for the light assembly L and the tube assembly T.

The light assembly L (Figs. 4 and 5) comprises a tube 60, light bulb 61, lens 62, cooling fins 63 and flexible connection 64. The tube 60 is preferably perforated for cooling.

The tube assembly T (Fig. 6) has a tube 70, photo-electric unit 71, lens 72 and flexible connection 73. The details of construction of the assemblies L and T form no part of the present invention.

Having described the detailed structure of my invention, the use and advantages thereof will be readily apparent. The segmental support 30 and assemblies L and T comprise a unit in which the assemblies L and T are angularly separately adjustable, but the two assemblies always remain in the same plane normal to the axis of the support 30 and are both always centered on said axis.

Furthermore, the above-defined unit may be shifted about to any desired position to secure clear vision of the rotating disc D, and may be securely held in any such position.

Adaptation of the scanning apparatus to varying meter constructions is thus easily performed and much time is saved by providing a common and permanently located focal point for the two separate assemblies L and T.

Having thus described my invention and the advantages thereof, I do not wish to be limited to the details herein disclosed, otherwise than as set forth in the claim, but what I claim is:

In a photo-electric meter-scanning apparatus having a light source assembly and a photo-electric tube assembly, that improvement which comprises providing a common support for said two assemblies in the form of a segmental plate, means to adjustably secure said assemblies on said support, means to maintain a common focal point for said assemblies, each assembly having two spaced positioning rolls engaging one edge of said segmental plate and having a single positioning roll engaging the other edge of said plate, unitary means to rotatably support said single roll and to clamp said assembly to said segmental plate in any adjusted position thereof but leaving said single roll free to rotate, and universal means being provided to mount said segmental plate for adjustment to any selected upright position in said apparatus.

HERBERT M. JOHNSON.

REFERENCES CITED

The following references are of record in the file of this patent:

UNITED STATES PATENTS

| Number | Name | Date |
| --- | --- | --- |
| 1,853,657 | Bradshaw et al. | Apr. 12, 1932 |
| 2,406,166 | Scott | Aug. 20, 1946 |
| 2,457,133 | Alden | Dec. 28, 1948 |
| 2,535,001 | Truesdell | Dec. 19, 1950 |